US005561794A

United States Patent [19]
Fortier

[11] Patent Number: 5,561,794
[45] Date of Patent: Oct. 1, 1996

[54] EARLY COMMIT OPTIMISTIC PROJECTION-BASED COMPUTER DATABASE PROTOCOL

[75] Inventor: Paul J. Fortier, Portsmouth, R.I.

[73] Assignee: The United States of America as represented by the Secretary of the Navy, Washington, D.C.

[21] Appl. No.: 238,036

[22] Filed: Apr. 28, 1994

[51] Int. Cl.⁶ .................................................. G06F 17/30
[52] U.S. Cl. .................. 395/600; 364/282.1; 364/962; 364/974; 364/DIG. 1; 395/650; 395/726; 395/727; 395/728
[58] Field of Search .................................. 395/600, 650, 395/575, 457, 446, 454, 456–459, 726, 727, 728

[56] References Cited

U.S. PATENT DOCUMENTS

| | | | |
|---|---|---|---|
| 4,627,019 | 12/1986 | Ng ..................................... | 364/DIG. 2 |
| 4,881,166 | 11/1989 | Thompson et al. ................. | 364/DIG. 1 |
| 5,050,075 | 9/1991 | Herman et al. ..................... | 364/DIG. 1 |
| 5,241,675 | 8/1993 | Sheth et al. ......................... | 395/600 |
| 5,263,156 | 11/1993 | Bowen et al. ...................... | 395/600 |
| 5,428,761 | 3/1992 | Herlihy et al. ..................... | 395/457 |

OTHER PUBLICATIONS

Fortier, Paul J., "Early Commit;" University of Massachusetts, Lowell, MA Apr. 28, 1993, pp. 1–29, 41–44.

Primary Examiner—Thomas G. Black
Assistant Examiner—Hosain T. Alam
Attorney, Agent, or Firm—Michael J. McGowan; James M. Kasischke; Prithvi C. Lall

[57] ABSTRACT

A computer database method wherein the data is organized into atomic data sets and transactions are separated into projections which operate on only one atomic data set. Multiple transactions can thereby access the same atomic data set using an optimistic protocol. An atomic data set counter is incremented on initial access to an atomic data set by a projection, and a local copy of the accessed data item is created. The issued command is executed while adding the timestamp and data item to the appropriate read or write set of the projection. Upon final access to the atomic data set by the projection, the local copy of the accessed data items is validated by comparing the read and write set of the projection with the read and write sets of all other projections that have accessed the atomic data set. If other projections conflict with the validating projection, the validating projection is aborted and restarted. Upon valid completion of the projection the local copy is written to the atomic data set.

3 Claims, 5 Drawing Sheets

BT $S_0$: sb $S_1$: $\quad v_1 := r(a)$ $S_2$: $\quad v_2 := r(b)$ $S_3$: $\quad v_3 := r(c)$ $S_4$: $\quad v_4 := r(d)$ $S_5$: $\quad v_4 := f_i(v_1, v_2, v_3)$ $S_6$: $\quad w(d, v_4)$ $S_7$: sc

$S_1$: $\quad v_1 := r(a)$ ⎤

$S_2$: $\quad v_2 := r(b)$ ⎥ $\pi_A(T)$ $S_3$: $\quad v_3 := r(c)$ ⎦

$S_4$: sb(B)

$S_5$: $\quad v_4 := r(d)$ ⎤ $\pi_B(T)$ $S_6$: $\quad v_4 := f_i(v_1, v_2, v_3)$ ⎦

$S_7$: sc(A)

$S_8$: $\quad w(d, v_4)$ ⎦ $\pi_B(T)$ $S_9$: sc(B)

| TIME | $\pi_A(1)$ | $\pi_A(2)$ | READ SET AND WRITE SET | TIMESTAMPS |
|---|---|---|---|---|
| $t_1$ | r(a) | | $RS(\pi_A(1)) = a$ | STARTTIME = X |
| $t_2$ | | r(a) | $RS(\pi_A(2)) = a$ | STARTTIME = X+1 |
| $t_3$ | | w(a) | $WS(\pi_A(2)) = a$ | VALIDATETIME = X+1 |
| $t_4$ | w(a) | | $WS(\pi_A(1)) = a$ | VALIDATETIME = X+1 |

FIG. 5

EARLY COMMIT OPTIMISTIC PROJECTION-BASED COMPUTER DATABASE PROTOCOL

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

This patent application is co-pending with four related patent applications entitled Early Commit Locking Computer Database Protocol, N.C. 75962 Ser. No. 08/238,045 filed on Apr. 28, 1994; Early Commit Timestamp Computer Database Protocol, N.C. 76259 Ser. No. 08/238,033 filed on Apr. 28, 1994; Replay Recovery Protocol for Real-Time Database Management Systems, N.C. 75806 Ser. No. 08/238,033, now U.S. Pat. No. 5,524,239; and Merge, Commit Recovery Protocol for Real-Time Database Management Systems, N.C. 74993, now U.S. Pat. No. 5,497,487 issued to Fortier, all by the same inventor and filed on the same date as subject patent application.

BACKGROUND OF THE INVENTION (1) Field of the Invention

The present invention relates to a computer database method for providing an early database commit while increasing database concurrency and limiting cascading aborts to minimize the impact on recovery for a decomposed database and transaction system.

(2) Description of the Prior Art

Real-time command, control and communications ($C^3$) systems control physical systems by extracting data from sensors, processing the extracted data, and performing control actions based on this processed data. Real-time $C^3$ systems are applied to applications where timeliness of data access, data processing and reactive responses are critical to the applications successful operations.

Real-time $C^3$ systems are being applied to a wide variety of physical systems, such as automotive control, aircraft control, spacecraft control, power management, automated factories, medical assistance and defense oriented systems. The main function of real-time $C^3$ systems is to manage and utilize information to control the real world environment. Therefore, these systems can be viewed as large information management systems that must respond in predictable ways and within specified time frames.

Real-time $C^3$ systems differ from conventional, general purpose systems in the sense that consistency and correctness of the real-time systems operation is dependent on the timeliness and predictability of responses to the controlled processes activities. In a real-time $C^3$ system, information is repeatedly collected from the physical system. Collected information is sampled, converted, formatted, timestamped and inserted into the control computer's database for each sampling period of the systems sensors. Stored data must be provided to the control software and system operators to be acted on to produce some desired control action.

Once the data is inserted into the database, it is used to compute a variety of related parameters. For example, raw sensor inputs from a radar system can be read and reduced to a bearing, range, and speed. These data items in turn can be used to compute detailed tracks of contacts, allowing for long-term tracking of an object. In addition, the raw information can be used to compute a profile on an object being tracked. This makes possible the classification and identification of an observed object. Transactions written to accomplish these computations require predictable and correct access, but not necessarily serializable access.

Real-time computing systems are being applied to a greater variety of control applications that require timely information.

Researchers are looking towards real-time computer systems as an emerging and important discipline in computer science and engineering. The real-time systems are characterized as possessing time dependent operations, reliable hardware and software, synergy with the controlled environment, predictable service. Predictability should be maintained not only in task scheduling, but also in scheduling all assets such as input/output, processing, communications, storage, and specialized controllers.

Databases within real-time systems must satisfy not only database consistency constraints but also timing constraints associated with transactions.

Responsive real-time databases must be predictable yet timely in their service. Real-time databases must incorporate features from real-time operating systems schedulers. A means to select the most appropriate database action to perform is necessary, and the scheduler must be adaptive to an ever changing real-time systems state. For correct database operations, real-time schedulers must be integrated with high performance concurrency control algorithms.

Recovery techniques based on rollback are not adequate in a real-time environment nor are present concurrency control techniques based on locking due to added blocking delays. Transactions must use non-serializable techniques, embedded transaction semantic knowledge, decomposition of transactions and the database to form more concurrent executions.

Transactions represent the unit of work recognized by users as being atomic. "Atomic" meaning that the operation or operations must complete execution or be aborted all together. Transactions serve the dual purpose as the unit for concurrency and recovery in database systems. Concurrency provides for indivisible access to data objects by concurrently executing users; and recovery provides for data restoration due to hardware, software, and transaction failures.

Due to these properties researchers look towards the use of transactions as a tool for structuring computations in distributed systems.

Research into transaction decomposition is relatively new; however, researches have studied breaking transactions into nested elementary transactions to increase concurrency. One approach to this is to decompose transactions into disjointed operations separated by breakpoints which breakpoints define allowable interleaving to allow increased concurrency. Another approach is to decompose transactions into data flow graphs of transaction computations steps which can be optimized to increase performance.

The data itself can also be decomposed into atomic data sets (ADS) to allow a more concurrent execution of decomposed transaction steps. Many researchers indicate that a finer granularity on data objects can increase data concurrency if managed properly. Availability and timeliness of data and processing has been pointed out as being a desirable feature in real-time database management systems and may be more important that consistency. Thus, the cited research indicates using transaction decomposition, database decomposition, and parallel and concurrent execution of database actions to provide for increased performance.

Concurrency control is used to ensure database consistency while allowing a set of transactions to execute concurrently. The problem solved by concurrency control is to allow non-interfering readers and writers free access, while controlling and coordinating the actions of conflicting readers and writers. There are three basic concurrency control approaches for transaction processing in database systems: locking, timestamp ordering and optimistic. The basic concurrency control techniques rely on syntactic information to make concurrency control decisions. The correctness of the algorithms is based on serializability theory.

These concurrency control techniques are inherently pessimistic. They avoid conflicts by enforcing serialization of conflicting database actions. Prior art literature points out that serializability as a correctness criteria is to stiff a requirement for real-time systems. Real-time concurrency control algorithms, must integrate real-time scheduling algorithms with concurrency control techniques.

Semantic information about transactions can be used to develop non-serializable scheduling of transaction steps that nonetheless are correct executions. A prior art method using this breaks transactions into a collection of disjoint classes. Transactions that belong to the same class are compatible allowing for arbitrary interleaving, whereas transactions that belong to different classes are incompatible and cannot interleave. Another prior art method defines a scheme wherein the transaction writing system decomposes transactions into steps upon which concurrency control can be performed. Transactions are broken at breakpoints, and type classes defined on the breakpoints. Transactions of compatible classes can interleave at this point, others cannot. A further refinement of this technique is achieved by using a larger volume of transaction class types which results in a finer granularity of breakpoints. This system increases concurrency by adopting a looser definition of correctness than serializability.

Other prior art research suggests the use of decomposition of both transactions and the database into finer granules to increase concurrency. In this theory the database and transactions are decomposed into atomic data sets (ADS) and elementary transactions respectively. Elementary transactions are executed concurrently on distributed assets of an ADS. This theory suggests that if elementary transactions are serialized with respect to an ADS then correct and consistent database executions result.

The aforementioned schemes do not address the issues in management of real-time data which are driven by the needs of the overall system, based on criticality of operations, nature of deadlines, and timing requirements. This paper develops and presents transaction concurrency control algorithms for real-time systems, based on decomposition of both the database and individual transactions, along with the application of criticalness, deadlines, and timing requirements to improve real-time database systems performance and predictability.

SUMMARY OF THE INVENTION

Accordingly, it is a general purpose and object of the present invention to provide a method for operation of a real-time database system.

It is a further object that such real-time database system provide a high degree of concurrency.

Another object is that such database system provide updated data rapidly during transaction.

These objects are accomplished with the present invention by providing a computer database method wherein the data is organized into atomic data sets and transactions are separated into projections which operate on only one atomic data set. Multiple transactions can thereby access the same atomic data set using an optimistic protocol. An atomic data set counter is incremented on initial access to an atomic data set by a projection, and a local copy of the accessed data item is created. The issued command is executed while adding the timestamp and data item to the appropriate read or write set of the projection. Upon final access to the atomic data set by the projection, the local copy of the accessed data items is validated by comparing the read and write set of the projection with the read and write sets of all other projections that have accessed the atomic data set. If other projections conflict with the validating projection, the validating projection is aborted and restarted. Upon valid completion of the projection the local copy is written to the atomic data set.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Database systems manage formatted collections of shared data. The database consists of collections of data fields, which are the finest granularity of data units available for users to manipulate. A data field is a basic data type such as name, age, address, etc. These basic data fields are organized into data items. Data items are the units for managing concurrency. Data items are not nested inside each other. Data items can be in the form of conventional records or objects. In this application the terms "item" and "record" are used interchangeably.

Relationships in the form of mathematical predicates are defined over items of the database. These predicates restrict the altering of database data items and structures. Database consistency means that all constraints are true. Constraints have the general form of predicates on database items. Constraints between data items of the database describe how database structures and items can be manipulated.

Constraints on database items are used to decompose the database into atomic data sets (ADSs). The database is a set of data items. Let $i_1$, $i_2$ be two distinct items from the set of database items. Let constraint, $C(i_1, i_2)$, hold if there is a constraint that refers to $i_1$ and $i_2$. Let $C'$ denote the transitive and reflexive closure of C. The closure of constraints forms equivalence relations. The equivalence relations induced by $C'$ are called atomic data sets (ADSs). Consistency is maintained on each ADS in isolation from other ADSs.

Transactions define logical units of work on the database. Transactions have a lower bound (begin transaction, BT) and an upper bound (end transaction, ET) defining boundaries for transaction management. Between boundaries, transactions enclose operations on the database of the form: read a data item x, r(x) or write a data item x, w(x), and transaction code.

Figure 1:
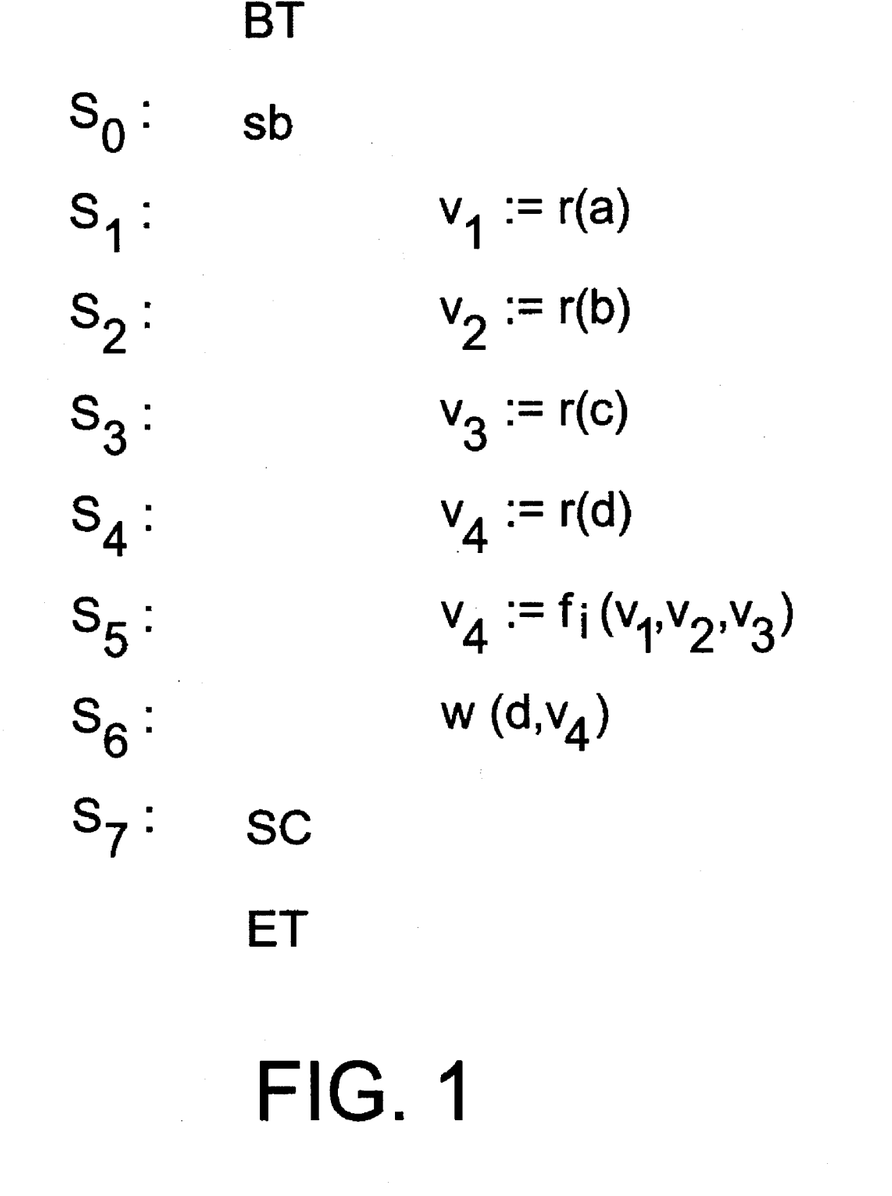
FIG. 1 shows an example of a transaction before it is broken into projections.

For example, consider the transaction of FIG. 1. Let $v_1$, $v_2$, $v_3$, and $v_4$ be variables of transaction T. Let a, b, c, and d be data items from an ADS. Execution of statement $S_6$: $w(d, V_4)$ causes the variable $V_4$ to be written to the data item d. Statement $S_1$: $v_1:=r(a)$ represents a read from data item a into variable $v_1$. The reading of a data item into a variable defines the variables value. Statement $S_5$ is an assignment statement. Assignment statements use variables to define new or existing variables. Statements of this type are of the form $v_0 :=f(vlist)$ where vlist represents a set of variables used in computing $v_0$ and f is a function performed over vlist. Ss applies function $f_i$ using variables $v_1$, $v_2$, and $v_3$ to define variable v4.

The conventional transaction model is extended to include boundaries on atomic data set accesses. These boundaries are formed on the initiation of access and termination of access to an atomic data set. The first request is preceded by a subbegin marker (sb) indicating the lower bound of access by this transaction on a named ADS. Terminate can be either a subabort (sa) or subcommit (sc) operation indicating the upper bound of access by this transaction on a named ADS.

A transaction accessing an ADS A, acquires resources in A as needed and releases resources once the last access to ADS A is performed. Transaction writers define when the first access to ADS A occurs and when the last access is performed. Boundaries for projections are formed using subbegin and subterminate statements.

After the last access to ADS A, a transaction cannot acquire more data items from ADS A. In this fashion the access and manipulation of ADS A, between the initial request for access until the final access forms a projection upon which concurrency control can be enforced. A projection $\pi_A(i)$ contains all accesses to ADS A from transaction $T_i$ and none from any other transaction.

Figure 2:
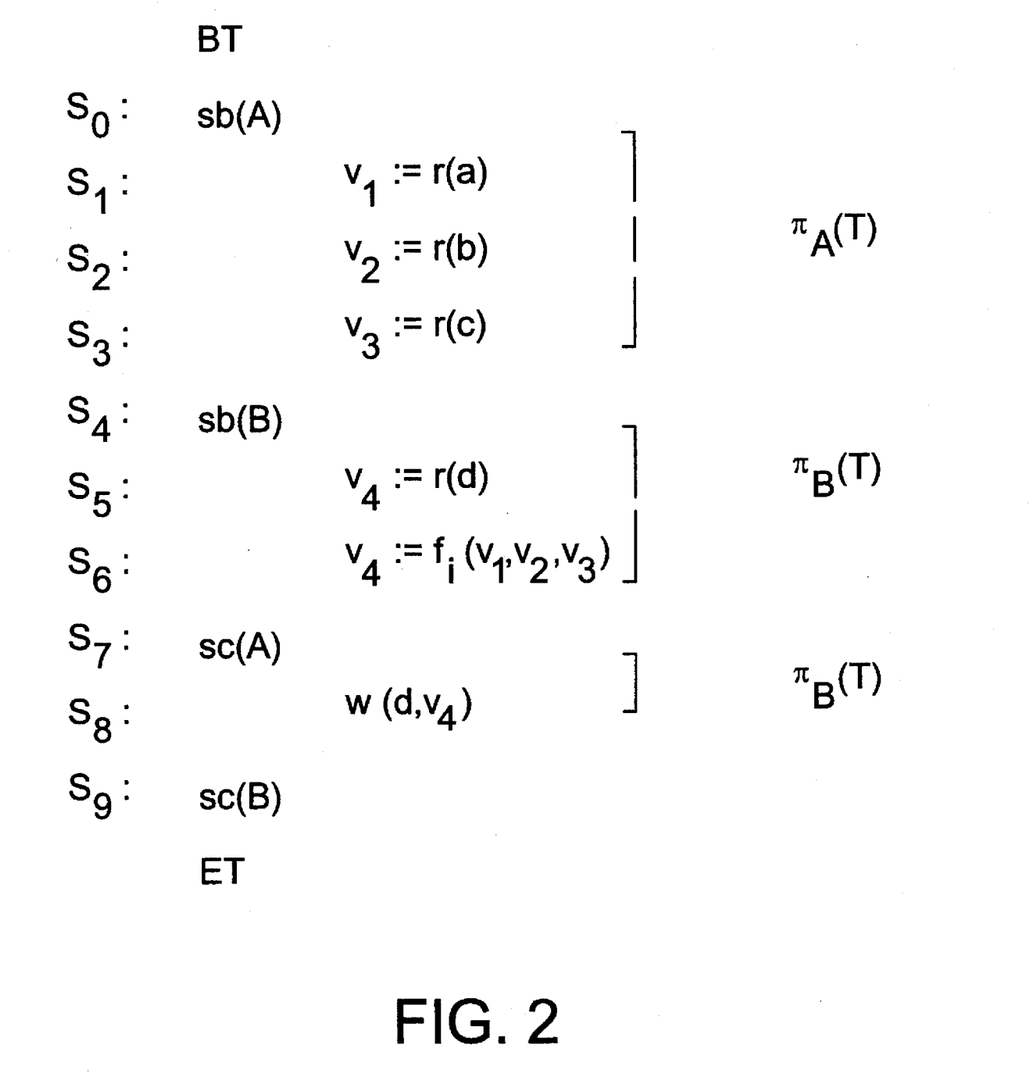
FIG. 2 shows an example of a transaction that has been broken into projections.

An example of projections from a transaction is shown in FIG. 2. In this example A and B are individual ADSs. Let a, b, and c be items from these ADS A, and d be an item from ADS B. Access to items in ADS A are bound in between sb(A) and sc (A), or sa(A), and, likewise, accesses to ADS B are bound between sb(B) and sc(B), or sa(B). A statement that reads a data item defines the variable the data item is read into. A read statement is in the projection controlling access to the data item read.

In the example of FIG. 2, statements $S_1$, $S_2$, $S_3$ define local variables $v_1$, $v_2$, and $v_3$ by reading ADS A data items a, b, and c into these variables. Statements $S_1$, $S_2$, and $S_3$ are in projection $\pi_A$ since variables $v_1$, $v_2$, and $v_3$ are defined by reading data items from ADS A. Statement $S_s$ defines variable $v_4$ by reading data item d from ADS B into $v_4$. Statement $S_5$ is in $\pi_B$ by reading a data item from ADS B.

A statement that writes a data item defines the data item. A write statement is in the projection controlling access to the data item written. In the example of FIG. 2 statement $S_6$ defines data item d of ADS B when it performs the write operation $w(d, v_4)$; therefore, statement $S_6$ is in projection $\pi_B$.

A statement, S directly depends on a statement S' if S follows S' and S uses at least one variable defined by S'. In the example of FIG. 2, assignment statement $S_5$ defines variable $v_4$ by performing a function f on variables in projection $\pi_A$. Since statement $S_5$ uses variables from statements $S_1$, $S_2$ and $S_3$, $S_5$ directly depends on $S_1$, $S_2$ and $S_3$.

A statement S depends on a statement S' if S directly depends on S', or there is a statement $S^*$ such that S directly depends on $S^*$ and $S^*$ depends on S'. In the example of FIG. 2, write statement $S_8$ writes data item d using variable $v_4$. Variable $v_4$ was defined in $S_5$, therefore $S_8$ depends on $S_5$. In addition since $S_5$ directly depends on $S_1$, $S_2$ and $S_3$, $S_8$ depends on $S_1$, $S_2$ and $S_3$.

A projection accesses data items outside of its boundaries by using statements in siblings. A projection $\pi$ that uses statements that are in or depend on a sibling $\pi'$, depend on $\pi'$. In FIG. 2, statements $S_5$ and $S_6$ are in projection $\pi_B$, and statements $S_1$, $S_2$ and $S_3$ are in $\pi_A$. Statement $S_6$ uses variable $v_4$ defined by statement $S_5$ which depends on statements $S_1$, $S_2$ and $S_3$. Since $S_6$ depends on $S_5$ and $S_5$ depends on statements in $\pi_A$, then $\pi_B$ depends on $\pi_A$.

A projection $\pi$ that depends on a sibling $\pi'$ cannot commit until $\pi$ commits. In FIG. 2 projection $\pi_B$ cannot commit until projection $\pi_A$, is ready to commit. The delaying of commit will maintain the correctness of executions in the face of failures.

Projections act independently on ADS's. A projection acts on a single ADS reading data items into variables, using variables to perform computations and to define variables and data items. If no interaction with sibling projections occur the projection can commit. If a projection uses a sibling's variables, it depends on the sibling projection. Dependent projections must wait for siblings to commit to do likewise. A projection that depends on no siblings need not delay. In FIG. 2, projection $\pi_A$ can commit when ready since it does not depend on $\pi_B$ or any other sibling. Projection $\pi_B$ must delay commit until $\pi_A$ commits, since $\pi_B$ depends on $\pi_A$. Correct and consistent execution results if projections of a transaction coordinate in this fashion.

Projections from distinct transactions cannot use variables defined within other transactions. For correct and consistent execution, projections from distinct transactions must be committed serializably with each other on individual atomic data sets.

A projection $\pi_A(i)$ from a transaction $T_i$ and a projection $\pi_A(j)$ from another transaction $T_j$ that act on the same ADS A must execute such that, the effects of the concurrently executing projections on the database either precede or follow each other. In the above example, projection $\pi_A(i)$ Of $T_i$ either precedes execution of projection $\pi_A(j)$ Of $T_j$ or $\pi_A(i)$ follows the execution of projection $\pi_A(j)$. The correct execution of conflicting projections is determined by formation of projection schedules for each atomic data set and checking if the schedules are serializable.

Optimistic protocols assume conflicts are rare and place controls over access at the end of transaction execution. Requests for reads and writes of data are not delayed. All writes are performed immediately on copies of the data. Writes do not affect the actual database until after validation completes. Transactions go through read, validate, and write phases. Validation checks if updates to the database violate consistency or serializability. Once updates are shown to be correct, they are entered into the actual database. If validation fails, the transaction is aborted and restarted.

The early commit optimistic disclosed herein differs from conventional approaches in how and when the validation is performed. Validation in our protocol is broken into multiple components. ADS-serializable execution validation is performed for accesses by each projection independently after the last access to the ADS. If validation succeeds, the projection commits. If validation fails, only the failing projection is aborted and restarted.

This scheme breaks down execution of a transaction into separate isolated actions on each ADS accessed. Smaller pools of reads and writes to be validated result in a higher probabilities of validation success. Unlike conventional systems, each ADS maintains individual timestamps on accesses separate from each other and determines correctness independently.

Figure 3:
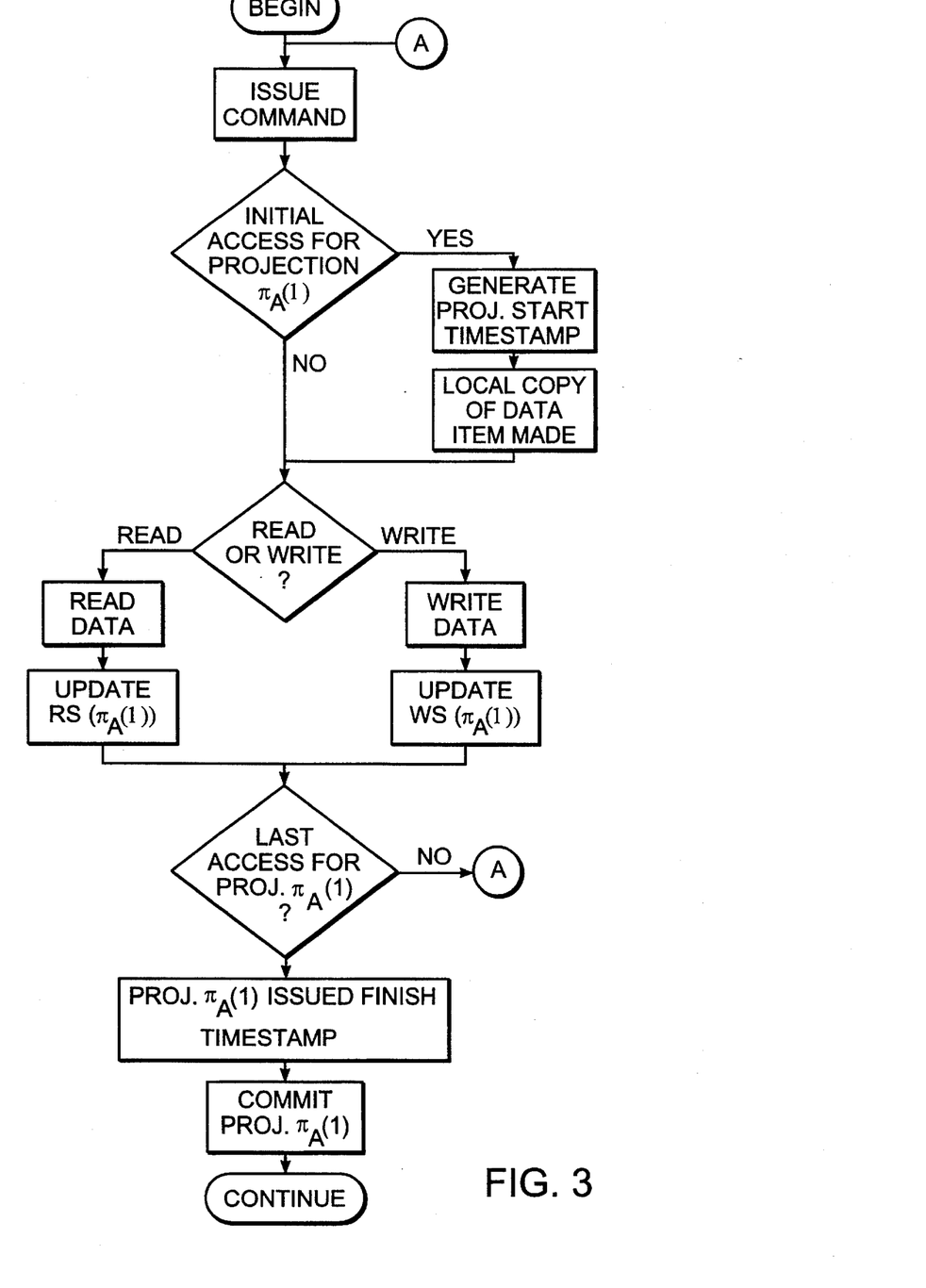
FIG. 3 shows a flow chart of the command execution process of the early commit optimistic protocol of the current invention.

In FIG. 3 there is shown the execution process for this protocol. Let A be an ADS and x a data item from A. Projections issue read requests, r(x), or a write requests, w(x), to the scheduler to access data item x from ADS A. Let $\pi_A(i)$ be a projection operating on ADS A. On a projection's initial request, a start timestamp is acquired from ADS A indicating the present counter for ADS A. A projection's first read of any data item makes a local copy of the item. Subsequent reads or writes to ADS A's data items by that projection are directed to the local copy. Reads and writes are entered into a read set and write set for $\pi_A(i)$.

Figure 4:
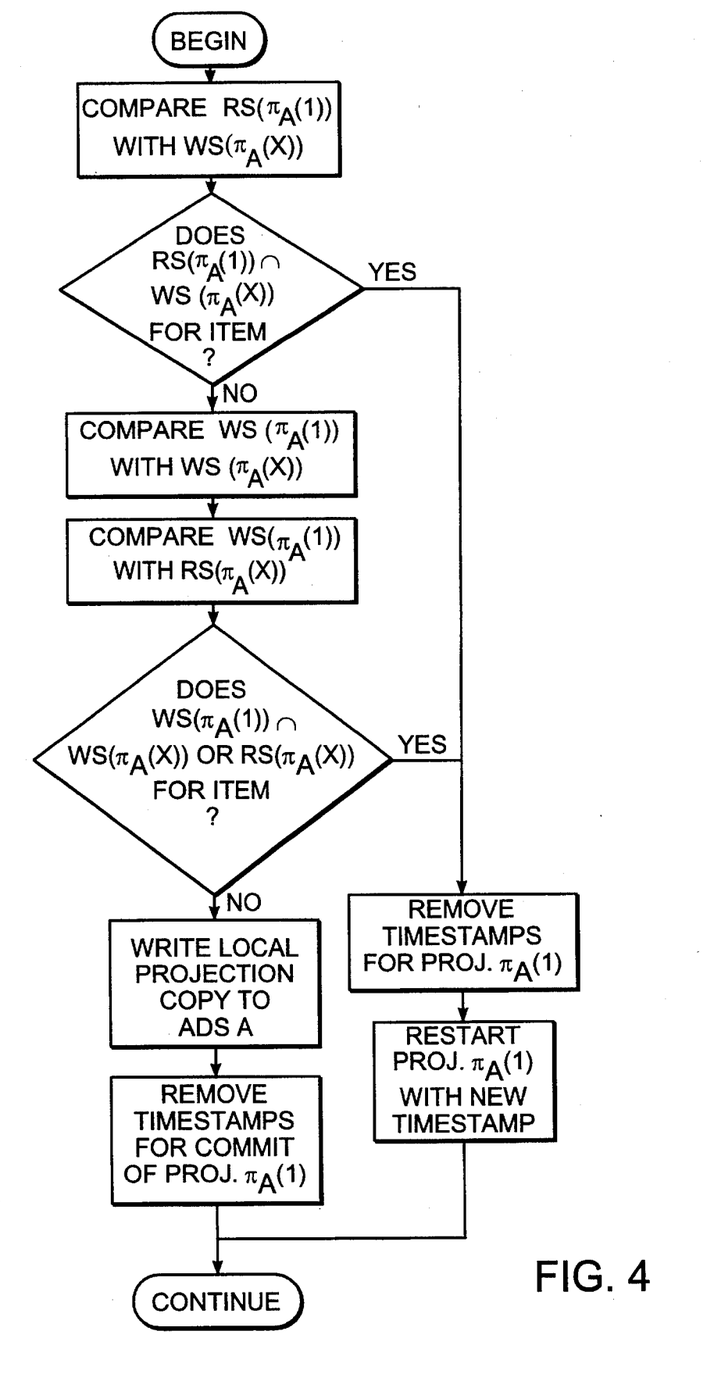
FIG. 4 shows a flow chart of the validation and commit process of the early commit optimistic protocol of the current invention.

On the last access to ADS A, $\pi_A(i)$ enters validation. FIG. 4 shows the validation and commit phase of this protocol. Validation begins by assigning a finish timestamp equal to the present count on A. Validation checks that the read set and write set of projection $\pi_A(i)$ do not intersect the read set or write set of any other projections acting on A with counts from the initial start count received to the finish count of $\pi_A(i)$. validation for projection $\pi_A(i)$ tests each ADS A accessed by projections $\pi_A(T)$ by determining for each time t if the write set of $\pi_A(T)$ during that time t intersects read set of $\pi_A(i)$. On finding an intersection, validation fails. $\pi_A(T)$ that have finished their read phase but not started their write phase are checked to determine if the write set of $\pi_A(i)$ intersects read or write set of $\pi_A(T)$. If such an intersection exists then validation fails.

If validation succeeds, then projection $\pi_A(i)$ writes its changes to ADS A updating timestamps for ADS A's data items. Clean-up requires the removal of $\pi_A(i)$ from A's active set.

Figure 5:
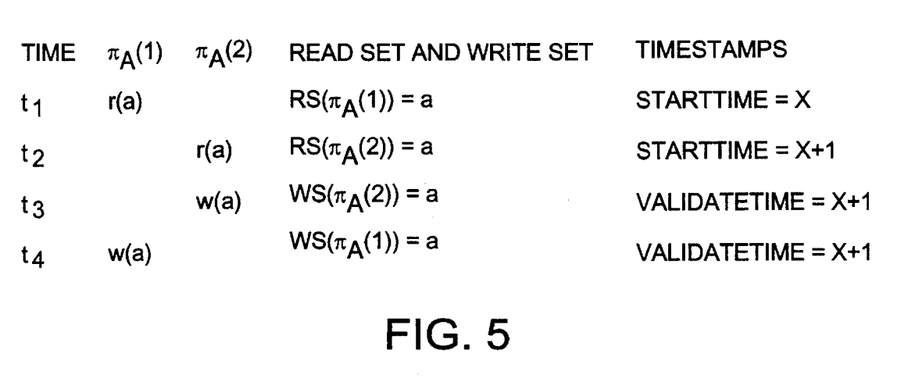
FIG. 5 shows the read set and write set conditions during the execution of two conflicting transactions.

On failure $\pi_A(i)$ is removed from the active set and restarted. Projection $\pi_A(i)$ will be restarted with a new timestamp and executes as above. In FIG. 5 for example, two projections, $\pi_A(1)$ and $\pi_A(2)$, from two distinct transactions that act on ADS A are shown. At time $t_3$, $\pi_A(2)$ attempts to validate, on testing the read and write sets between starttime, X+1, and validatetime=X+1, projection $\pi_A(2)$ finds that $RS(\pi_A(T)) \cap RS(\pi_A(2))=\emptyset$ and $RS(\pi_A(T)) \cap WS(\pi_A(2))=\emptyset$ resulting in transaction $T_2$ committing. $T_1$ then enters its validation and fails the test, since $T_2$'s commit left the read and write sets with item a. $T_1$ aborts then restarts, and since no other conflicts are present in this example, it will run and commit.

All operations are performed on local copies of the read and written data items for the projection. In addition to enhance commit, writes are written through, using the projection's active copy index to new locations in the non-volatile storage. The local copy acts as the read set and write set for the projection. To provide this feature, the initial timestamp and final timestamp are also stored in the recovery block.

Each ADS keeps an active pool of read and written data items and their timestamps. These structures are used to keep track of read and written data items. On commit, a projection validates its read set and write set with the master index maintained read set and write set. If no conflicts are found, the projections copy index is made into the master index and the read set and write set pointers are adjusted to point to this copy as the maintainer of the master read and write sets for this ADS.

The early commit protocols of the current invention differ from conventional protocols in fundamental ways. The database is composed of a collection of atomic data sets instead of a single monolithic database. Each ADS maintains consistency in isolation from other ADSs. Transaction operations are partitioned over ADSs. Each transaction's collection of operations on an ADS constitutes a projection of these operations over the ADS. Projections from distinct transactions operate on individual ADSs serializably.

The advantages of the present invention over the prior art are that the early commit optimistic protocol partitions transaction execution into smaller units that can be committed sooner, allowing committed data items to be available for further processing sooner than allowable by conventional transaction level protocols. Furthermore, an early commit is achieved by assuming that conflicts between projections will not occur.

Obviously many modifications and variations of the present invention may become apparent in light of the above teachings. In light of the above, it is therefore understood that within the scope of the appended claims, the invention may be practiced otherwise than as specifically described.

What is claimed is:

1. A method for computer database construction and use comprising the steps of:

organizing data items into atomic data sets, each atomic data set having an associated counter to provide timestamps;

breaking down transactions containing a plurality of statements operating on said data into projections which operate on only one said atomic data set;

issuing commands by said projections, said commands comprising read commands and write commands, said read commands and write commands accessing data items of an atomic data set;

allowing multiple transactions and projections to access said atomic data set;

incrementing said associated atomic data set counter to create an incremented timestamp upon the initial accessing command from a projection to the atomic data set;

making a local projection copy of said accessed data item upon initial issuance of a command accessing the atomic data set;

creating a read set for said projection;

creating a write set for said projection;

performing the issued command, said issued command being performed on said local projection copy of said data item, said issued read command writing said incremented timestamp to a read set for said accessed data item, and said issued write command writing said incremented timestamp to a write set for said accessed data item;

validating said local projection copy of said accessed data items after said projection issues a final access command, said validation using said read set and write set for said projection and said read and write sets for other said projections accessing said atomic data set to indicate that said projection passes validation if said data items being validated are consistent and that said projection fails validation if said data items can be inconsistent because of access by said other projections;

removing said projection write set and said projection read set after validation;

making said atomic data set data items reflect changes in said local projection copy of said data items when said local projection copy passes validation; and restarting said projection with a new timestamp when said local projection copy fails validation.

2. The method of claim 1 wherein said step of validating said local projection copy comprises the steps of:

assigning a final timestamp to the validating projection;

comparing the validating projection read set with the write set of other projections accessing the same atomic data set for each data item for all timestamps between the initial validating projection timestamp and the final validating projection timestamp;

failing validation when said compared write set indicates that said other projections have written to said data item after said issuance of said read command;

comparing the validating projection write set with the read set and the write set of other projections accessing the same atomic data set for each data item for all timestamps between the initial validating projection timestamp and the final validating projection timestamp;

failing validation when said compared other projection read and write sets indicate that said other projections have either written to or read said data item after said issuance of said validating projection write command; and passing validation when said comparison indicates that said projection is in agreement with said other projections.

3. The method of claim 1 wherein said step of organizing data items into atomic data sets comprises the steps of:

establishing constraints regarding the fields and the records required to be in an atomic data set; and generating an atomic data set from said data items in accordance with said established constraints.

\* \* \* \* \*